(12) United States Patent
Borland et al.

(10) Patent No.: US 6,352,736 B2
(45) Date of Patent: *Mar. 5, 2002

(54) LIQUID COFFEE PRODUCT

(75) Inventors: Carol Borland, Richwood; Pu-Sheng Cheng; Nora Lantin, both of Dublin, all of OH (US)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/343,263

(22) Filed: Jun. 30, 1999

Related U.S. Application Data

(60) Provisional application No. 60/093,903, filed on Jul. 23, 1998.

(51) Int. Cl.[7] .................................................. A23L 5/00
(52) U.S. Cl. ....................................... 426/594; 426/106
(58) Field of Search ................................. 426/594, 106

(56) References Cited

U.S. PATENT DOCUMENTS

| 4,948,009 A | 8/1990 | Sawatani | 220/229 |
|---|---|---|---|
| 5,384,143 A | 1/1995 | Koyama et al. | 426/546 |
| 6,056,989 A | * 5/2000 | Sasagawa et al. | |
| 6,093,436 A | * 7/2000 | Zheng et al. | |

FOREIGN PATENT DOCUMENTS

| DE | 2114851 | 10/1972 |
|---|---|---|
| EP | 0 745 329 A1 | 12/1996 |
| FR | 1127518 | 6/1955 |
| GB | 2 089 191 | 6/1982 |
| JP | 57-50845 | * 3/1982 |
| JP | 57163438 | 10/1982 |

OTHER PUBLICATIONS

Rosa, Marco Dalla et al., "Changes in Coffee Brews in Relation to Storage Temperature" *J. Sci. Food Agric.* b50:227–235, 1990.

* cited by examiner

*Primary Examiner*—Anthony J. Weier
(74) *Attorney, Agent, or Firm*—Winston & Strawn

(57) ABSTRACT

A ready-to-serve coffee product which provides a refreshing beverage or topping. The product is a black, coffee containing liquid in an aseptically filled container. The liquid has a fresh, clean taste and may contain more than 2% by weight of soluble coffee solids. The liquid is produced by extracting coffee solids from roast and ground coffee at a draw-off ratio of less than about 3. The concentration of soluble coffee solids in the coffee extract is then adjusted to less than about 5% by weight under oxygen-reduced conditions.

19 Claims, No Drawings

LIQUID COFFEE PRODUCT

This application claims the benefit of provisional application No. 60/093,903, filed Jul. 23, 1998.

FIELD OF THE INVENTION

This invention relates to a liquid coffee product which may be used as a refreshing beverage or topping. The invention also provides a method for the production of the liquid coffee product.

BACKGROUND TO THE INVENTION

Ready-to-serve coffee-based beverages are becoming increasing popular. Very often, these beverages contain milk solids or a whitener. Apart from providing a beverage having an appearance and taste similar to that of whitened coffee, the milk solids or whitener performs the function of masking some of the harsher flavors which may arise in ready-to-drink coffee beverages. When served chilled, however, coffee beverages which contain milk solids or a whitener are perceived to be less refreshing than black coffee beverages.

Ready-to-serve black coffee beverages are available; especially in Asian markets. To avoid harsh flavors, however, these beverages contain less than 2% by weight of soluble coffee solids. Also, these beverages are usually heavily sweetened. Despite this, these beverages are often still characterized by harsher, dirty flavors and often do not provide very refreshing beverages when consumed chilled.

Therefore, there remains a need for a black, ready-to-serve, coffee-based product which has a fresh, clean flavor, and this invention addresses this need.

SUMMARY OF THE INVENTION

Accordingly, in one aspect, this invention provides a ready-to-serve coffee product comprising an aseptically filled container, and a black, coffee containing liquid in the container; where the liquid has a fresh, clean taste. Preferably, the liquid has a coffee solids concentration of above about 2% by weight; and more preferably above about 2.2% by weight. Also, the liquid preferably has a ratio of aldehydes to furans of less than about 1:12.

In another aspect, the black, coffee containing liquid is produced by a process comprising the steps of extracting coffee solids from roast and ground coffee at a draw-off ratio of less than about 3 to produce a coffee extract; and adjusting the concentration of soluble coffee solids in the coffee extract to less than about 5% by weight under oxygen-reduced conditions to provide the coffee containing liquid. Preferably, the coffee containing liquid is aseptically filled into the container.

In yet another aspect, this invention provides a method for providing a chilled coffee beverage, by the steps of providing an aseptically filled container containing a black, coffee containing liquid; the liquid having a fresh, clean taste and a concentration of soluble coffee solids above about 2 to 2.2% by weight; opening the container; and pouring the black, chilling the coffee containing liquid, such as by pouring it over ice particles from shaved or crushed ice.

In a further aspect, this invention provides a dessert topping product which comprises an aseptically filled container; and a black, coffee containing liquid in the container; the liquid having a fresh, clean taste and a concentration of soluble coffee solids above about 2% by weight. The coffee containing liquid may contain a sweetener and may contain flavors.

DETAILED DESCRIPTION OF PREFERRED EMBODIMENTS OF THE INVENTION

Embodiments of the invention are now described by way of example only. This invention provides a liquid, black coffee product which has a fresh, clean taste with little objectionable bitter and harsh notes and which is in ready-to-serve form. The liquid coffee product may contain high amounts of soluble coffee solids; for example above 2% by weight. In general, conventional black, liquid coffee products which are provided in ready-to-serve form have a soluble coffee solids content of about 1% and below. Concentrations of soluble coffee solids above about 1.5% by weight generally cannot be used in conventional products since the product would then have objectionable harsh and bitter notes.

In this specification, the term "draw-off ratio" means the ratio of the weight of the coffee extract removed from the extraction system to the weight of fresh coffee introduced into the extraction system.

The term "$F_o$ value" means the equivalent time in minutes for a product held at a temperature of 121° C.

In this specification, the term "Furans" means compounds of the furan class including 2-methylfturan.

The term "Diketones" means aroma compounds of the diketone class including 2,3-butanedione, and 2,3-pentanedione.

The term "Aldehydes" means aroma compounds of the aldehyde class including isobutyraldehyde, 3-methyl-butanal, and 2-methyl-butanal.

The term "Pyrroles" means compounds of the pyrrole class including 1-methyl-1H-pyrrole.

The term "ppm methyl butyrate" means the calculated amount of a compound based upon the response factor of methyl butyrate.

The liquid, black coffee product is produced by preparing a coffee extract. The coffee extract is prepared by subjecting roasted coffee beans to extraction under mild temperature conditions and using a low draw-off ratio. The roasted coffee beans are preferably ground prior to extraction. Any suitable beans or blends or beans may be used. Naturally, the better the bean quality, the better the product finally produced.

The extraction may be carried out in a counter-current manner in one or more extraction vessels. Any suitable extraction vessels may be used; for example fixed bed reactors or continuous counter-current extractors. The choice and design of the vessels is a matter of preference and has no critical impact on the process. Further, if fixed bed reactors are used, the extraction liquid may be caused to flow upward through the reactor or downward through the reactor, as desired. The extraction is conveniently carried out in a battery of fixed bed reactors connected such that extraction liquid may flow through them in series.

The extraction is carried out under relatively mild conditions such that little or no hydrolysis of the coffee solids takes place. Therefore, the temperature of the extraction liquid used to extract the coffee solids is preferably below about 140° C.; and more preferably below about 120° C.

The extraction liquid is conveniently hot water which may be, but need not necessarily be, deoxygenated. Coffee extract may also be used as the extraction liquid but this is less preferred.

The draw-off ratio for the extraction is preferably less than about 3:1; more preferably less than about 2:1. It is surprisingly found that extraction using low draw-off ratios provides a coffee extract with a cleaner, fresher taste with fewer harsh notes.

The coffee extract obtained will usually have a concentration of coffee solids in the range of about 8% to about 15% by weight. The coffee extract is maintained under reduced oxygen conditions. If desired, oxygen scavengers or antioxidants such as ascorbic acid may be added to the coffee extract. If it is necessary to store the coffee extract for any significant length of time, storage is best conducted under refrigerated conditions.

The coffee extract is then formulated to provide the liquid coffee product. Ingredients such as sweeteners, flavors, buffers and the like may be added and the concentration of the soluble coffee solids reduced to the desired level. Ordinarily, the concentration of the soluble coffee solids will be adjusted to about 0.8% to about 3.5% by weight; more preferably about 2% to about 3% by weight.

If used, examples of suitable buffers include sodium and potassium bicarbonate, di-sodium and di-potassium phosphates, and sodium and potassium citrates. Various combinations of these buffers may also be used. The buffering system used will depend largely upon regulations in the various countries.

Further, if used, examples of suitable sweeteners include sugar, artificial sweeteners such as saccharin, cyclamates, acetosulfame, sucralose, L-aspartyl based sweeteners such as aspartame, and mixtures of sugar and artificial sweeteners.

Suitable flavors which may be used include vanilla, bourbon, whisky, chocolate, and the like.

The mixture of all components may then be subjected to homogenization if necessary. Oxygen-reduced conditions are preferably used during formulation of the liquid coffee product.

The homogenized mixture is then preferably subjected to ultra high temperature (UHT) treatment. This may be accomplished by rapidly heating the mixture to a temperature above about 135° C.; for example to about 140° C. to about 150° C. This may be carried out in a suitable heat exchanger or by direct injection of steam into the liquid beverage mix. Suitable heat exchangers are plate heat exchangers, tubular heat exchangers and scraped surface heat exchangers; plate heat exchangers being particularly suitable.

The mixture is held at the raised temperature for a time less than about 2 minutes but sufficient to provide a $F_o$ value of at least about 4. Depending upon the temperature to which the mixture is heated, the mixture is conveniently held at the temperature for about 5 seconds to about 60 seconds. The $F_o$ value reached is preferably about 5 for products which will be cold vended. For products which will be hot vending, the $F_o$ value may be about 60 to 75.

The treated mixture is then cooled to a temperature below about 60° C.; for example to less than about 40° C. This may be conveniently accomplished by using a suitable heat exchanger or by flash cooling the beverage. Again a plate heat exchanger is a particularly suitable heat exchanger. Flash cooling is especially suitable if the mixture was heated using direct injection of steam since the introduced steam may then be flashed off. Otherwise the increase in water content must be accounted for when preparing the mixture.

If needed and not added earlier, suitable buffers and other additives may be may be added at this point.

The liquid coffee product obtained is then aseptically filled into suitable containers. Standard aseptic filling machinery may be used. The containers are then sealed and stored. The aseptic filling is preferably carried out under reduced oxygen conditions.

If desired, although less preferable, the liquid coffee product may be filled into suitable containers and then retorted. In this case, aseptic filling is not necessary. The filling is preferably carried out under reduced oxygen conditions. Standard filling and retorting machinery may be used.

The products obtained are characterized by a fresh, clean taste with little of the harsh, bitter notes of most conventional ready-to-drink black coffee beverages. This is despite the fact that the product may contain raised levels of soluble coffee solids. The products may be consumed in many different ways. For example, the product may be poured over crushed or shaved ice to provide a refreshing beverage. Alternatively, the product may be used as a topping on desserts such as ice cream. Further, the product may be frozen and served as a dessert; especially when mixed with other frozen desserts or fresh whole milk.

It is found that the products contain an advantageous ratio of aldehydes to furans of less than about 1:12; more preferably about 1:4 to about 1:10. It is believe that these characteristics have a favorable impact on the flavor of the products.

EXAMPLES

Specific examples of the invention are now described to further illustrate the invention. In the examples, aroma components are analyzed using gas chromatography and mass spectrometry. The aroma components are introduced into the gas chromatograph using a purge and trap method (no static headspace). The components separated in the gas chromatograph are detected using a mass spectrometer. The conditions of the gas chromatograph and mass spectrometer are as follows:

| | |
|---|---|
| Column | Restek RTX-1 60 m × 0.25 mm × 1.0 μm |
| Flow rate | 20 ml/minute in He carrier gas |
| Split ratio | 20:1 |
| Initial temperature | 35° C. |
| Initial hold time | 1 minute |
| Temperature increase rate | 4° C. per minute |
| Final temperature | 190° C. |
| Solvent delay | 0 minutes |
| Scan range | 35 to 260 amu |
| Electron energy | 70 volts. |

All results are expressed in ppm methyl butyrate units.

Example 1

An extraction battery of three fixed-bed extractors is used. The extractors are connected in series such that an extraction liquid may flow into a first extractor, to the second extractor, to the third extractor, and then out of the third extractor. The third extractor contains a charge of about 27 kg of fresh Arabica coffee grounds. The second extractor, which was the third extractor in a previous cycle, contains partially extracted coffee grounds. The first extractor, which was the second extractor in a previous cycle, contains the most extracted coffee grounds.

Water at about 104° C. is introduced into the first extractor as the extraction liquid. The draw-off ratio is about 1.7:1 to provide about 45 kg of coffee extract. The extraction yield is about 20% and the concentration of coffee solids is about 11% by weight. The coffee extract is held in a container sized such that little or no head-space is present.

The coffee extract is diluted to a coffee solids concentration of about 1% by weight under reduced oxygen conditions. Buffering agents are added and the coffee product is aseptically filled into packs containing about 250 ml. Reduced oxygen conditions are maintained.

The coffee product has a fresh, clean taste with nutty and roasty notes.

Example 2

The coffee extract of example 1 is diluted to a coffee solids concentration of about 1% by weight under reduced oxygen conditions. Sugar (about 5% by weight) and buffering agents are added and the mixture is aseptically filled into packs containing about 250 ml. Reduced oxygen conditions are maintained.

The coffee product has a fresh, clean taste with nutty and roasty notes.

Example 3

A pack produced according to example 1 is opened and the coffee product is then analyzed for diketones, aldehydes, furans, and pyrroles. The results are as follows:

| Compound | Product of Example 1<br>Amount (ppm methyl butyrate) |
| --- | --- |
| Diketones | 0.2 |
| Aldehydes | 1.2 |
| Furans | 0.1 |
| Pyrroles | 0.08 |
| Isobutyraldehyde | 0.4 |
| 3-methyl-butanal | 0.4 |
| 2-methyl-butanal | 0.4 |

Example 4

A pack produced according to each of examples 1 and 2 is opened and the coffee product is then analyzed for acids. The acid break down of each coffee product is as follows:

| Acid | Product of example 1<br>Amount mg/g | Product of example 2<br>Amount mg/g |
| --- | --- | --- |
| Quinate | 1.37 | 1.09 |
| Acetate | 0.28 | 0.20 |
| Glycolate | 0.12 | 0.10 |
| Formate | 0.14 | 0.11 |
| Chloride | 0.03 | 0.02 |
| Malate | 0.11 | 0.09 |
| Fumarate | 0.01 | 0.02 |
| Sulfate | 0.07 | 0.03 |
| Oxalic | 0.01 | 0.00 |
| Phosphate | 0.07 | 0.07 |
| Citrate | 0.25 | 0.25 |

The pH of each product is 5.9. The product of example 1 has a turbidity of 14.00 NTU while the product of example 2 has a turbidity of 32.00 NTU. These results indicate that the product are relatively clear.

Example 5

A coffee extract is produced as described in example 1 and is diluted to a coffee solids concentration of about 2.5% by weight under reduced oxygen conditions. Buffering agents, sugar and honey are added and the coffee product is aseptically filled into packs containing about 250 ml. Reduced oxygen conditions are maintained.

The coffee product has the following constituents:

| Substance | Amount (weight %) |
| --- | --- |
| Water | 75.405 |
| Sugar | 18.93 |
| Coffee solids | 2.5 |
| Honey | 3.0 |
| Sodium Bicarbonate | 0.165 |

The coffee product is then analyzed for diketones, aldehydes, furans, and pyrroles. The results are as follows:

| Compound | Product of Example 5<br>Amount (ppm methyl butyrate) |
| --- | --- |
| Diketones | 0.2 |
| Aldehydes | 1.2 |
| Furans | 0.1 |
| Pyrroles | 0.05 |
| Isobutyraldehyde | 0.4 |
| 3-methyl-butanal | 0.4 |
| 2-methyl-butanal | 0.4 |

The pH of the coffee product is about 6.2 to 6.4. The coffee product is poured over crushed ice to provide an iced beverage. The ice beverage has a fresh, clean taste with nutty and roasty notes. The beverage is refreshing with no perceivable bitter and harsh notes despite the high concentration of coffee solids.

Example 6

The coffee product of example 5 is poured over vanilla ice cream and presented to a taste panel as a dessert. The dessert is readily consumed with none of the panel finding objectionable bitter and harsh notes.

What is claimed is:

1. A ready-to-serve coffee product comprising an aseptically filled container; and a black, coffee containing liquid in the container; the liquid including soluble coffee solids at a concentration of above 2% to less than 5% by weight.

2. The product according to claim 1 which has a ratio of aldehydes to furans of less than about 1:12.

3. The ready-to-serve coffee product of claim 1; wherein the liquid has a concentration of soluble coffee solids of above about 2.2% by weight.

4. The product according to claim 3 in the form of a dessert topping.

5. A ready-to-serve coffee product comprising a black, coffee containing liquid in a container; wherein the liquid is produced by a process comprising:
   extracting coffee solids from roast and ground coffee at a draw-off ratio of less than about 3 to produce a coffee extract; and
   adjusting the concentration of soluble coffee solids in the coffee extract to above 2% and less than 5% by weight under oxygen-reduced conditions to provide the coffee containing liquid.

6. The product according to claim 5 in which the coffee containing liquid is aseptically filled into the container.

7. The product according to claim 6 in which the coffee containing liquid is thermally treated at a temperature above 135° C. to obtain an $F_o$ value of at least 4 prior to aseptic filling.

8. The product according to claim 5 which has a ratio of aldehydes to furans of less than about 1:12.

9. A ready-to-serve dessert topping product which comprises an aseptically filled container; and a black, coffee containing liquid in the container; the liquid having a concentration of soluble coffee solids above 2% to less than 5% by weight.

10. The product according to claim 9 in which the liquid has a coffee solids concentration of above about 2.2% by weight.

11. The product according to claim 9 which has a ratio of aldehydes to furans of less than about 1:12.

12. The product according to claim 1 wherein the coffee containing liquid further comprises one or more of a buffer, a sweetener or a flavor.

13. The product according to claim 5 wherein the coffee containing liquid further comprises one or more of a buffer, a sweetener or a flavor.

14. The product of claim 1, wherein the soluble coffee solids are obtainable by extraction at a low draw off ratio of less than 3 from roast and/or ground coffee.

15. The product of claim 9, wherein the soluble coffee solids are obtainable by extraction at a low draw off ratio of less than 3 from roast and/or ground coffee.

16. A ready-to-serve coffee product comprising an aseptically filled container and a black, coffee containing liquid in the container, the liquid including soluble coffee solids and having a ratio of aldehydes to furans of less than about 1:12.

17. The product of claim 16 wherein the ratio of aldehydes to furans is between about 1:4 to 1:10.

18. The product of claim 16 wherein the coffee containing liquid further comprises one or more of a buffer, a sweetener or a flavor.

19. The product of claim 16, wherein the soluble coffee solids are obtainable by extraction at a low draw off ratio of less than 3 from roast and ground coffee.

* * * * *